Oct. 17, 1950  W. H. BASELT  2,525,762
BRAKE BEAM SUPPORT ON TRUCK FRAME
Filed April 13, 1948  2 Sheets-Sheet 1
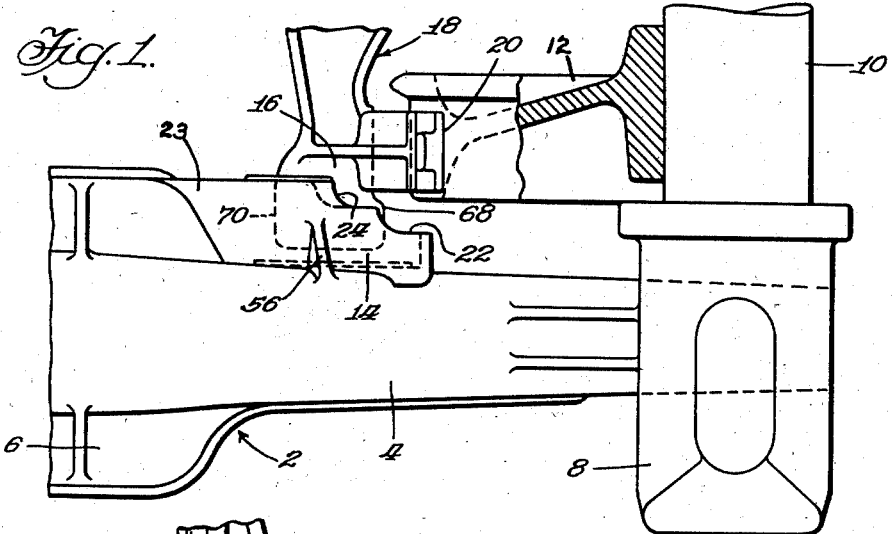
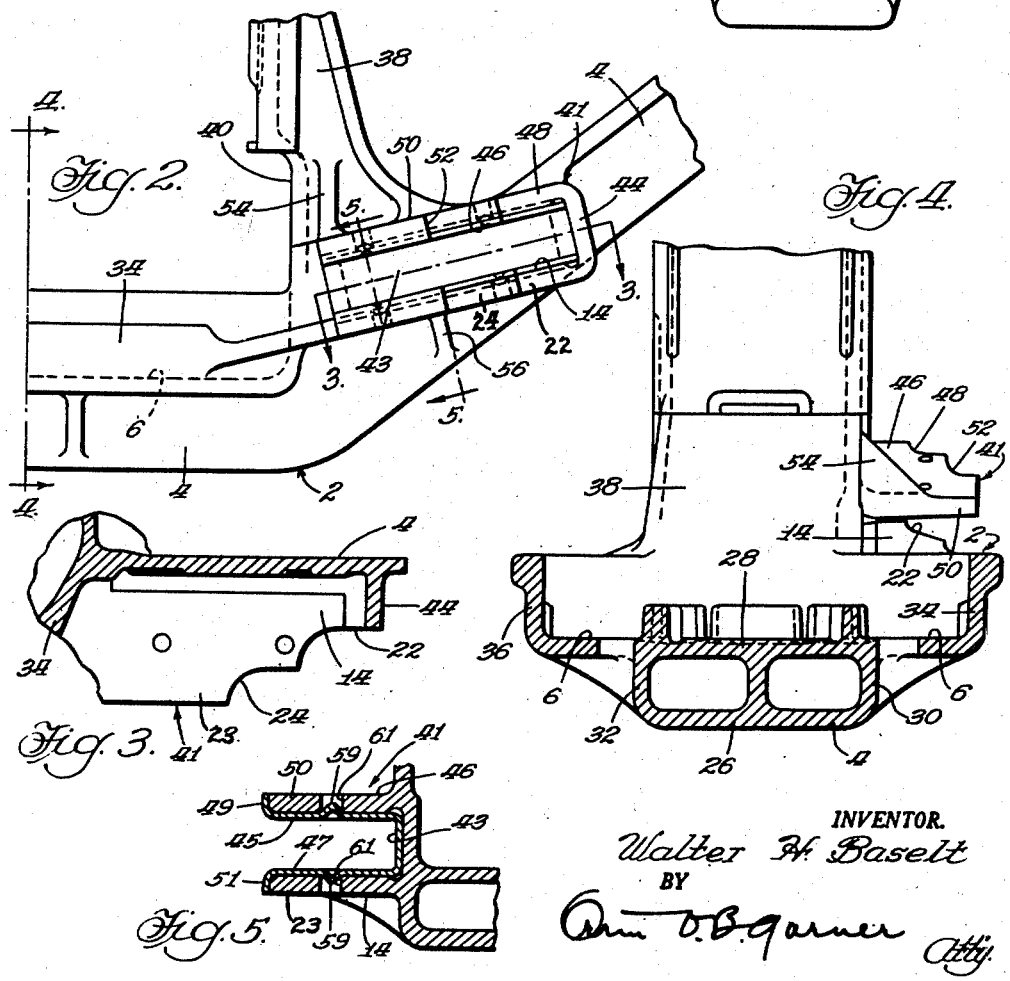
INVENTOR.
Walter H. Baselt

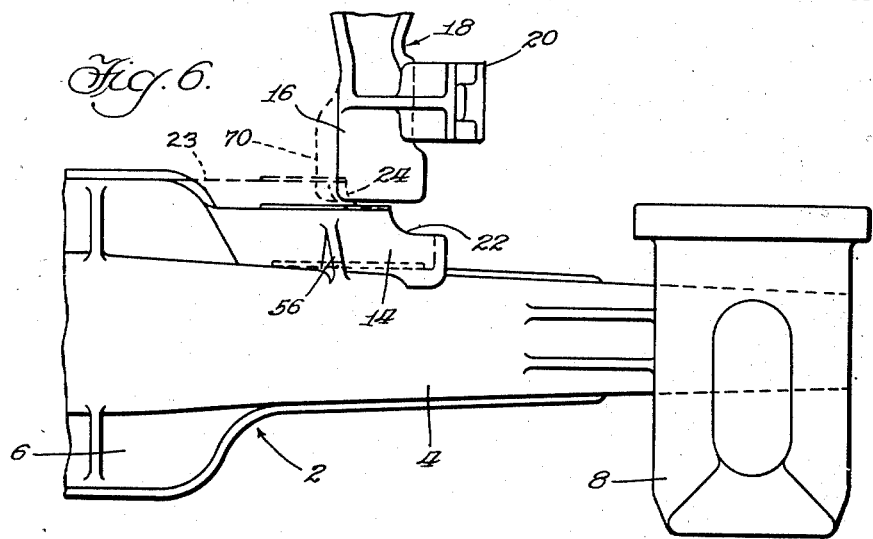
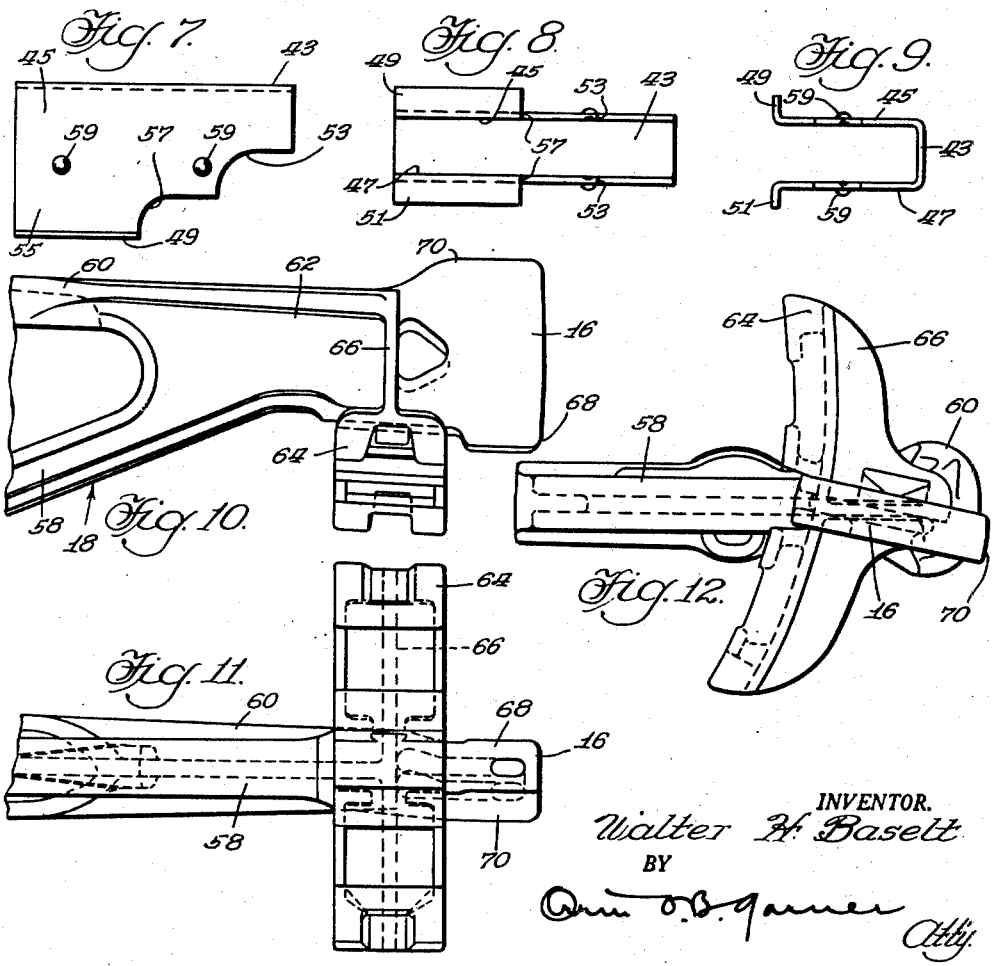

Patented Oct. 17, 1950

2,525,762

UNITED STATES PATENT OFFICE 2,525,762

BRAKE BEAM SUPPORT ON TRUCK FRAME

Walter H. Baselt, Flossmoor, Ill., assignor to American Steel Foundries, Chicago, Ill., a corporation of New Jersey Application April 13, 1948, Serial No. 20,622

12 Claims. (Cl. 188—212)

This invention relates to railway car trucks and more particularly to a novel safety support for brake beams guided and supported at their ends on truck frame ledges.

As is well known in the art, the conventional hanger type mounting for brake beams has been supplanted in many railway car trucks by an arrangement in which the beams are mounted at their ends on side frame ledges which slidably support the beams in their movement toward and away from the wheels.

This slidable end type mounting for brake beams was originally developed for use in spring plank freight car trucks wherein the side frames are connected by planks which afford seats for the bolster supporting springs and has subsequently been adapted to spring plankless trucks wherein the bolster is spring supported directly from the side frames thereby simplifying the truck structure and affording greater flexibility.

It has been known for several years that slidably mounted beams of the above type, particularly in spring plankless trucks, may fall off the side frame support ledges due to spreading of the side frames under certain conditions and a number of complicated safety devices have been devised to prevent the beams from falling to the road bed. Such devices are not only expensive and cumbersome but merely support the beam in substantially inoperative condition pending servicing of the truck.

A primary object of the present invention is to devise a novel safety device for beams of the above type which will prevent their falling to the road bed due to spreading of the side frames and will maintain the beam in operative relationship with the truck frames at all times.

Another object of the invention is to provide a rearward extension on the beam cooperating with a rear inboard extension on the side frame ledge to support the beam under conditions of maximum wear and maximum side frame spreading.

A further object of the invention is to provide a side frame brake beam support ledge with a wheel recess and a brake head recess adapted respectively to receive the adjacent wheel and brake head of the truck under various operating conditions.

Still another object of the invention is to devise a novel wear plate for reception in a side frame bracket to afford a safety support for the beam.

The foregoing and other objects and advantages of the invention will become apparent from a consideration of the following specification and the accompanying drawings, wherein:

Figure 1 is a fragmentary bottom plan view partly in section of a railway car truck embodying the invention;

Figure 2 is a fragmentary inboard side elevational view of the truck frame shown in Figure 1;

Figure 3 is a sectional view taken on the line 3—3 of Figure 2 with the wear plate removed;

Figure 4 is a view taken on the line 4—4 of Figure 2 with the wear plate removed;

Figure 5 is a sectional view on the lines 5—5 of Figure 2;

Figure 6 is a fragmentary bottom plan view comparable to Figure 1 but illustrating a conventional truck under conditions of maximum wear and side frame spreading with the novel brake beam and side frame safety extensions indicated in dot and dash lines;

Figures 7 to 9 show the novel wear plate, Figure 7 being a top plan view, Figure 8 being a front elevational view, and Figure 9 being an end view taken from the right of Figure 8;

Figure 10 is a fragmentary top plan view of the brake beam shown in Figure 1;

Figure 11 is a front view of the brake beam; and

Figure 12 is an end view thereof.

Describing the invention in detail and referring first to Figure 1, the invention is disclosed as applied to a conventional spring plankless truck including a side frame, generally designated 2, comprising a tension member 4 having a flanged spring seat 6 and a journal box 8. The journal box is adapted to receive the journal end of an axle 10 having a wheel 12 fitted thereon in the usual manner.

The tension member 4 and spring seat 6 are formed, as hereinafter described in detail, with a brake beam support ledge 14 affording slidable support for a guide member 16 on the outboard end of a brake beam 18 including a head 20 carrying associated brake shoe means (not shown) for braking engagement with the periphery of the wheel 12. The brake beam, in the illustrated embodiment of the invention, is in the form of a single casting including the head 20 and the guide member 16; however, it will be readily understood by those skilled in the art that the beam may be fabricated in any conventional manner with the head removably secured thereto and the guide member 16 connected either to the head 20 or some other portion of the beam.

The ledge 14 comprises a wheel recess 22 adapted to receive the wheel 12 under conditions of extreme lateral displacement of the wheel relative to the frame 2, and the ledge comprises a safety extension 23 having a recess 24 adapted to receive the brake head 20 in the released position of the beam which is illustrated in Figure 1 in its applied position to effect braking of the wheel 12.

Referring now to Figures 2 and 4, it will be seen that the tension member 4 is a box-section member comprising a bottom web 26, a top web 28 and inboard and outboard webs 30 and 32, the top web 28 being flanged to afford the before-mentioned spring seat 6 which extends across the top web 28 and is adapted to support associated bolster supporting springs (not shown). The spring seat 6 is provided with inboard and outboard upstanding flanges 34 and 36 adapted to confine said springs and afford positioning means therefor. The tension member is also formed at each end of the spring seat 6 with a column 38 defining therewith a bolster opening 40.

As best seen in Figures 2 and 3, the side frame is formed with a bracket 41 for reception of the beam member 16, said bracket being defined at the bottom thereof by the ledge 14 which merges at its outboard edge with the tension member 4 and at its rear edge with the spring seat flange 34. Also the ledge 14 is provided at its rear inboard extremity with the before-mentioned coplanar safety extension 23 having the recess 24. The front end of the ledge 14 merges with a web 44 connected to a top web or ledge 46 having a wheel recess 48 corresponding to the recess 22 and having an inboard rear safety extension 50 and brake head recess 52 corresponding to the extension 42 and recess 24 of the ledge 14. The web 46 is reinforced by a gusset 54 (Figure 2) and the ledge 14 is similarly reinforced by a gusset 56.

The bracket 41 is provided with a wear plate 43, U-shaped in transverse cross-section as best seen in Figures 5 and 9. The top and bottom legs 45 and 47 of the wear plate are flanged as at 49 and 51 to protect the inboard edge of the bracket. Referring to Figures 7 to 9, it will be seen that the wear plate legs are provided with wheel recesses 53 adapted to register with the recesses 22 and 48 and are provided with safety extensions 55 and brake head recesses 57 corresponding respectively to the safety extensions 23 and 50 and to the brake head recesses 24 and 52 of the side frame webs 14 and 46 which define the before-mentioned bracket 41.

The wear plate 43 is preferably formed of spring steel and comprises top and bottom nipples or projections 59 adapted to be snapped into corresponding openings 61 in the ledges 14 and 46 when the wear plate is entered into the bracket, as best seen in Figure 5.

The brake beam 18 is shown in detail in Figures 10 to 12 and comprises a truss structure including a tension member 58 and a compression member 60 merging at each end of the beam to form an end portion 62 having a brake head 64 and the before-mentioned support member 16 in the form of a lug integrally formed with the outboard surface of a vertical brake head wall 66. This lug has the usual forward extension 68 adapted to afford maximum wearing area and in addition comprises a rearward safety extension 70 projecting beyond the rear edge of the portion 62 and adapted to afford a safety support for the beam, as hereinafter discussed.

Referring now to Figure 6, a conventional truck is shown in solid lines with the parts corresponding to those of Figure 1 identified by corresponding numerals. The novel safety support ledge 23 and brake beam safety extension 70 are indicated in dot and dash lines to clarify the manner in which applicant's invention functions to positively prevent the beam 18 from falling to the road bed under the conditions of maximum wear and maximum side frame spreading illustrated in this figure. The beam, shown in Figure 6, is in applied position with the beam at its extreme upward or forward position assumed under conditions of maximum brake shoe and wheel wear and the side frame displaced from its normal position to an extreme outboard position assumed under conditions of maximum side frame spreading, as will be readily understood by those skilled in the art. Under the conditions illustrated, brake beams supported by the illustrated type of mounting have fallen to the road bed as will be readily understood by a consideration of the conventional truck shown in solid lines in Figure 6 wherein the brake beam support member 16 is without support by the ledge 14. Thus it will be understood that the safety ledge 23 affords support for the guide member 16 under conditions of maximum side frame spreading except where these conditions occur with the beam in the applied position shown in Figure 6 under conditions of maximum shoe and wheel wear and the safety extension 70 on the rear edge of the guide member 16 is operative to support the beam on the safety extension 23 under such circumstances.

It may be noted that, if desired, the safety extension 50 on the top ledge 46 may be eliminated to afford clearance for several types of beam in current railway service and also, if desired, the invention may be practical by utilizing removable ledges 14 and 46 such as are well known in the art rather than the integral ledges illustrated in the preferred embodiment.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake arrangement for a railway car truck comprising a side frame with a journal box, a wheel and axle assembly including an axle supporting the box and a wheel on the axle inboardly of the box, the combination of a support ledge on the inboard side of said frame sloping upwardly toward said box, the vertical plane of the inboard extremity of said ledge passing through the box, a wheel recess at the upper inboard corner of the ledge, an integral substantially coplanar safety extension on said ledge defining therewith a brake head recess disposed downwardly and inboardly from the wheel recess, the vertical plane of the inboard edge of said extension passing inboardly of the box, a brake beam having an end portion, a brake head carried thereby and adapted to support associated brake shoe means for engagement with the wheel in applied position of the beam, said beam having a guide element outboardly of the head and slidably supported on the ledge for movement to and from applied position, said wheel recess and brake head recess being adapted to receive the wheel and brake head respectively under certain operating conditions.

2. In a brake arrangement for a railway car truck comprising a side frame having a journal box, a wheel and axle assembly including an axle extending into the box and a wheel on the axle inboardly of the box; the combination of a support ledge on the inboard side of the frame sloping upwardly towards the box, inboard and outboard spring positioning flanges on the frame, the inboard flange merging with the lower end of said ledge, a wheel recess at the upper inboard corner of the ledge, an integral substantially coplanar safety extension on the ledge defining therewith a brake head recess disposed downwardly and inboardly from the wheel recess, a brake beam having an end portion, a brake head carried thereby and adapted to support associated brake shoe means for engagement with the wheel in applied position of the beam, said beam having a support element outboardly of the head and slidably supported on the ledge for movement to and from applied position, said wheel recess and brake head recess being adapted to receive the wheel and brake head respectively under certain operating conditions.

3. In a brake arrangement for a railway car truck comprising a side frame having a journal box, a wheel and axle assembly including an axle extending into the box and supporting the same, and a wheel on the axle inboardly of the box; the combination of a support ledge on the inboard side of the frame sloping upwardly toward the box, a wheel recess at the upper inboard corner of the ledge, an integral substantially coplanar safety extension on the ledge defining therewith a brake head recess disposed downwardly and inboardly of the wheel recess, a brake beam having a brake head and an outboard support element slidably supported on the ledge for movement upwardly and downwardly along the same to applied and released positions respectively of the beam, said wheel recess and brake head recess being adapted to receive the wheel and brake head respectively under certain operating conditions.

4. A side frame for a railway car truck comprising a tension member having a bottom web and a relatively wide top web with inboard and outboard upstanding flanges defining a spring seat, a journal box connected to the tension member at the end thereof remote from the seat, a brake beam support ledge connected to the inboard flange and extending upwardly therefrom toward said box, a wheel recess in the upper inboard corner of the ledge, and an integral substantially coplanar safety extension on said ledge and defining therewith a brake head recess disposed downwardly and inboardly of the wheel recess, the lower end of said extension merging with the inboard flange.

5. A spring-plankless side frame for a railway car truck comprising a tension member having a bottom web and a relatively wide top web with inboard and outboard upstanding flanges defining a spring seat, a brake beam support ledge connected to the inboard flange and extending upwardly therefrom toward an end of the frame, and a safety extension on said ledge merging with the inboard flange.

6. A spring-plankless railway car truck side frame comprising a tension member having a top web with inboard and outboard upstanding flanges defining a spring seat, a bracket on the inboard side of said frame comprising a lower ledge connected to the inboard flange and extending upwardly therefrom toward the end of the frame, a safety extension on said ledge extending inboardly therefrom and spaced from the upper end thereof, said bracket comprising an upper ledge disposed above the lower ledge and approximately parallel thereto, and a safety extension on the upper ledge above the first mentioned safety extension.

7. A side frame for a railway car truck comprising a tension member having a bottom web and a relatively wide top web with inboard and outboard upstanding flanges defining a spring seat, a journal box connected to said tension member at the end thereof remote from said seat, and a brake beam support ledge connected to the inboard flange and extending upwardly therefrom toward said box, and a safety extension on said ledge.

8. A spring-plankless railway car truck comprising a tension member having a top web with inboard and outboard upstanding flanges defining a spring seat, a brake beam support ledge connected to the inboard flange and extending upwardly therefrom toward an end of the frame, the inboard edge of said ledge being approximately linear and being arranged so that a vertical plane passing along said edge intersects said web, and a safety extension on said ledge spaced from the upper extremity thereof, the inboard edge of said extension being substantially linear and being so arranged that a vertical plane passing along the last mentioned edge passes inboardly of the web.

9. A railway car truck side frame comprising a pair of substantially parallel sloping top and bottom ledges having substantially flat surfaces therebetween defining a slot at the inboard side of the frame for slidable reception of an associated brake beam, the upper inboard corners of the ledges having top and bottom wheel recesses respectively, and substantially coplanar safety extensions on the inboard edges of respective ledges and defining with said ledges top and bottom brake head recesses disposed downwardly and inboardly of respective wheel recesses.

10. A side frame for a railway car truck comprising a spring-plankless tension member with a central spring seat and portions sloping upwardly therefrom toward the ends of the member, and a brake beam support ledge on the inboard side of said member sloping upwardly toward an end thereof, said ledge having a wheel recess at its upper inboard corner, a substantially coplanar safety extension on the inboard edge of said ledge and spaced from said corner thereof to define therewith a brake head recess disposed downwardly and inboardly from the wheel recess.

11. A railway car truck side frame including a tension member having a spring seat and portions sloping upwardly from said seat toward the end of the frame, a brake beam support ledge on the inboard side of the frame sloping upwardly toward an end thereof, a wheel recess at the upper inboard corner of the ledge, and a substantially coplanar safety extension on the inboard edge of the ledge spaced from said corner thereof to define therewith a brake head recess.

12. A wear plate for a railway brake beam guide bracket comprising a U-shaped member of wear resistant material having top and bottom legs, a wheel recess in at least one leg at the forward edge thereof, and a safety extension on said one leg rearwardly of the wheel recess.

WALTER H. BASELT.

REFERENCES CITED

The following references are of record in the file of this patent:

UNITED STATES PATENTS

| Number | Name | Date |
|---|---|---|
| 700,810 | Peckham | May 27, 1902 |
| 2,170,112 | Busch | Aug. 22, 1939 |
| 2,276,065 | Schaefer | Mar. 10, 1942 |
| 2,348,092 | Parke | May 2, 1944 |
| 2,398,917 | Busch | Apr. 23, 1946 |